United States Patent
TenBrink et al.

(10) Patent No.: US 10,012,307 B2
(45) Date of Patent: Jul. 3, 2018

(54) AUTOMATIC TRANSMISSION SHIFTER WITH SPEED SENSITIVE DAMPING

(71) Applicants: Jay T TenBrink, Goodrich, MI (US); Michael Perecki, Brownstown, MI (US)

(72) Inventors: Jay T TenBrink, Goodrich, MI (US); Michael Perecki, Brownstown, MI (US)

(73) Assignee: FCA US LLC, Auburn Hills, MI (US)

( * ) Notice: Subject to any disclaimer, the term of this patent is extended or adjusted under 35 U.S.C. 154(b) by 233 days.

(21) Appl. No.: 15/053,560

(22) Filed: Feb. 25, 2016

(65) Prior Publication Data

US 2017/0248223 A1    Aug. 31, 2017

(51) Int. Cl.
| | | |
|---|---|---|
| B60K 20/00 | (2006.01) | |
| G05G 5/00 | (2006.01) | |
| F16H 59/02 | (2006.01) | |
| F16H 59/10 | (2006.01) | |

(52) U.S. Cl.
CPC ......... F16H 59/0208 (2013.01); F16H 59/10 (2013.01)

(58) Field of Classification Search
CPC ................. F16H 59/0208; F16H 59/10; F16H 2061/246; F16H 61/24
See application file for complete search history.

(56) References Cited

U.S. PATENT DOCUMENTS

| | | | |
|---|---|---|---|
| 5,189,924 A * | 3/1993 | Altenheiner | B60K 20/02 200/61.88 |
| 5,682,789 A * | 11/1997 | DeCrouppe | F16H 59/0204 74/335 |
| 6,530,293 B1 * | 3/2003 | Ruckert | F16H 59/105 324/207.23 |
| 7,467,569 B2 | 12/2008 | Wang | |
| 2005/0217405 A1 * | 10/2005 | Suzuki | F16H 59/10 74/473.12 |
| 2006/0185461 A1 * | 8/2006 | Kino | F16H 59/10 74/473.3 |
| 2008/0006115 A1 * | 1/2008 | Mitteer | F16H 61/22 74/473.21 |
| 2009/0025501 A1 * | 1/2009 | Mitteer | F16H 61/22 74/473.12 |
| 2011/0056318 A1 * | 3/2011 | Rake | F16H 59/0278 74/473.12 |
| 2013/0145889 A1 * | 6/2013 | Vermeersch | F16H 59/02 74/473.36 |
| 2016/0305544 A1 * | 10/2016 | TenBrink | F16H 59/0204 |

* cited by examiner

*Primary Examiner* — Jake Cook
(74) *Attorney, Agent, or Firm* — Ralph E. Smith

(57) ABSTRACT

A shifter assembly includes a shift lever, a base, a coupling member having a toothed member and pivotably coupling the shift lever to the base, and a speed sensitive damping arrangement housed in the base. The damping arrangement includes a housing associated with the base and defining an internal cavity, a shaft disposed in the cavity and having an end extending from the housing, and a gear coupled to the shaft end extending from the housing and configured for rotation therewith, where the gear is meshingly engaged with the toothed member of the coupling member such that pivotable movement of the coupling member rotates the gear and the shaft. The gear is configured to rotate faster than the shift lever such that damping to movement of the shift lever provided by the damping arrangement is proportional to a square of a speed of movement of the shift lever.

12 Claims, 6 Drawing Sheets

AUTOMATIC TRANSMISSION SHIFTER WITH SPEED SENSITIVE DAMPING

FIELD

The present application relates generally to a transmission shifter and, more particularly, to an electronic shifter assembly with a speed sensitive damping arrangement for a shift-by-wire automatic transmission.

BACKGROUND

Today's vehicles are often equipped with electronic shifters ("e-shifters") to place the vehicle's automatic transmission into a desired gear state. Electronic shifters can replace the traditional console mounted P-R-N-D-L mechanical shift lever and are typically implemented as levers, which can be pushed up/down or sideways to effect gear changes. The typical mono-stable lever type electronic shifter returns to its original or home position after it has been manipulated by the driver. A more recent development is to have a multi-position stable or poly-stable e-shifter that retains an actuator setting that represents a driver requested transmission gear state. With the poly-stable e-shifter, the shift lever can retain a manipulated position of the shift lever and, as such, may be preferred by drivers. The shift-by-wire transmissions associated with these e-shifters do not include a mechanical cable or link to the e-shifter nor the detent member that is incorporated within a mechanically shifted transmission, which provides damping to the shift lever mechanical system. Thus, these e-shifters experience less friction and damping than conventional mechanical shifted transmissions. However, such reduced friction can create a different feel during shifting and can make it easier to over-shoot a desired gear position. Accordingly, while conventional e-shifter arrangements for motor vehicles work for their intended purpose, there remains a need for improvement in the relevant art.

SUMMARY

In accordance with an aspect of the invention, an electronic shifter assembly is provided. The shifter assembly includes a shift lever, a coupling member pivotably coupling the shift lever to a base of the electronic shifter assembly, the coupling member having a toothed member, and a speed sensitive damping arrangement housed in the base. The damping arrangement includes a housing associated with the base and defining an internal cavity; a shaft disposed in the internal cavity and having an end extending from the housing; a gear member coupled to the end of the shaft and configured for rotation therewith, the gear member meshingly engaged with the toothed member such that pivotable movement of the coupling member rotates the gear member and the shaft; a damping member coupled to the shaft and positioned in the internal cavity such that rotation of the shaft via movement of the shift lever causes relative movement of the damping member; and a damping substance packed into the internal cavity and about the damping member such that the damping substance provides resistance to movement of the damping member. Pivotal movement of the shift lever causes the gear member and the damping member to rotate faster than the shift lever such that damping to movement of the shift lever provided by the speed sensitive damping arrangement is proportional to a square of a speed of movement of the shift lever.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
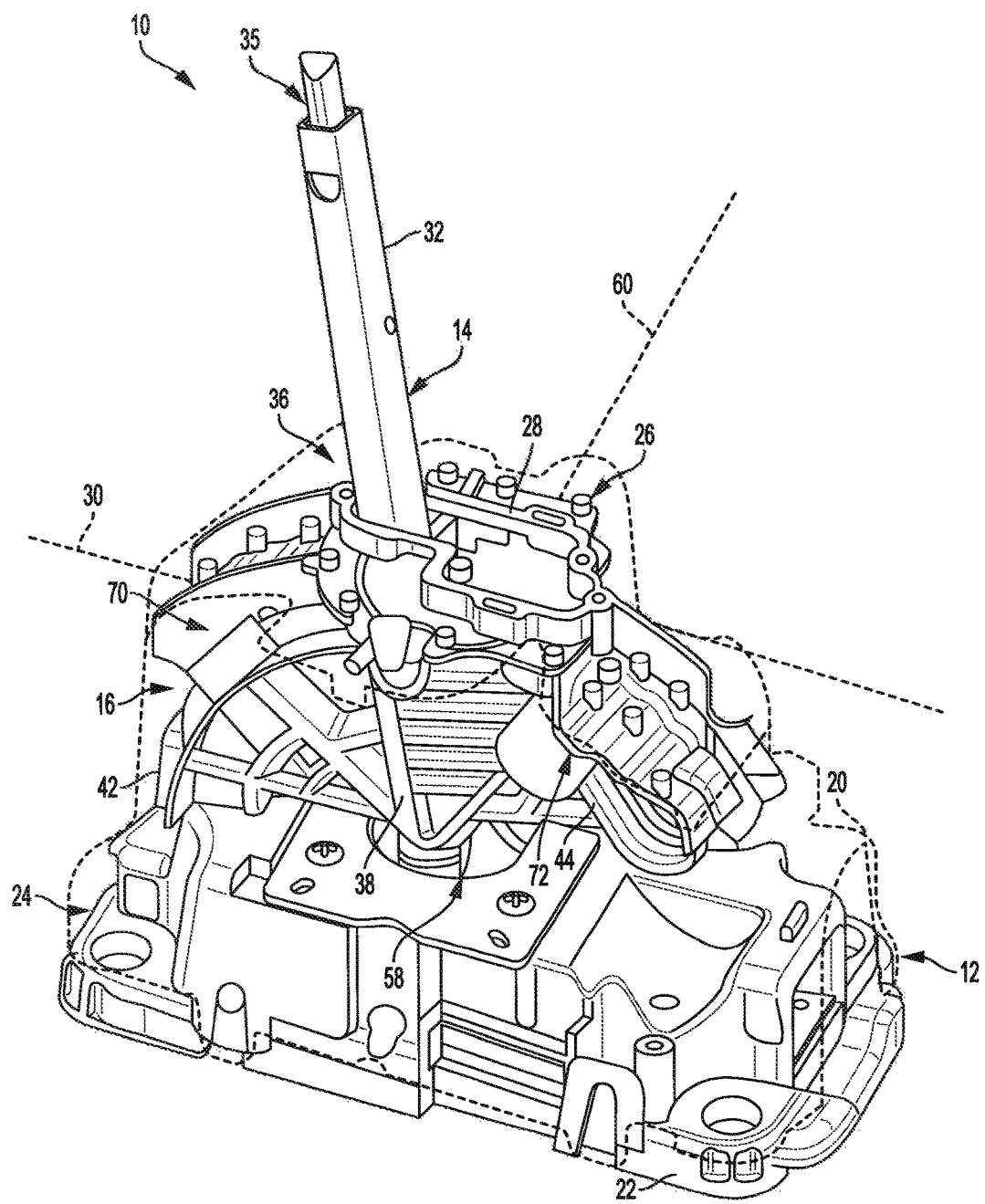
FIG. 1 is a front perspective view of an exemplary automatic transmission shifter assembly for a vehicle in accordance with the principles of the present disclosure.
Figure 2:
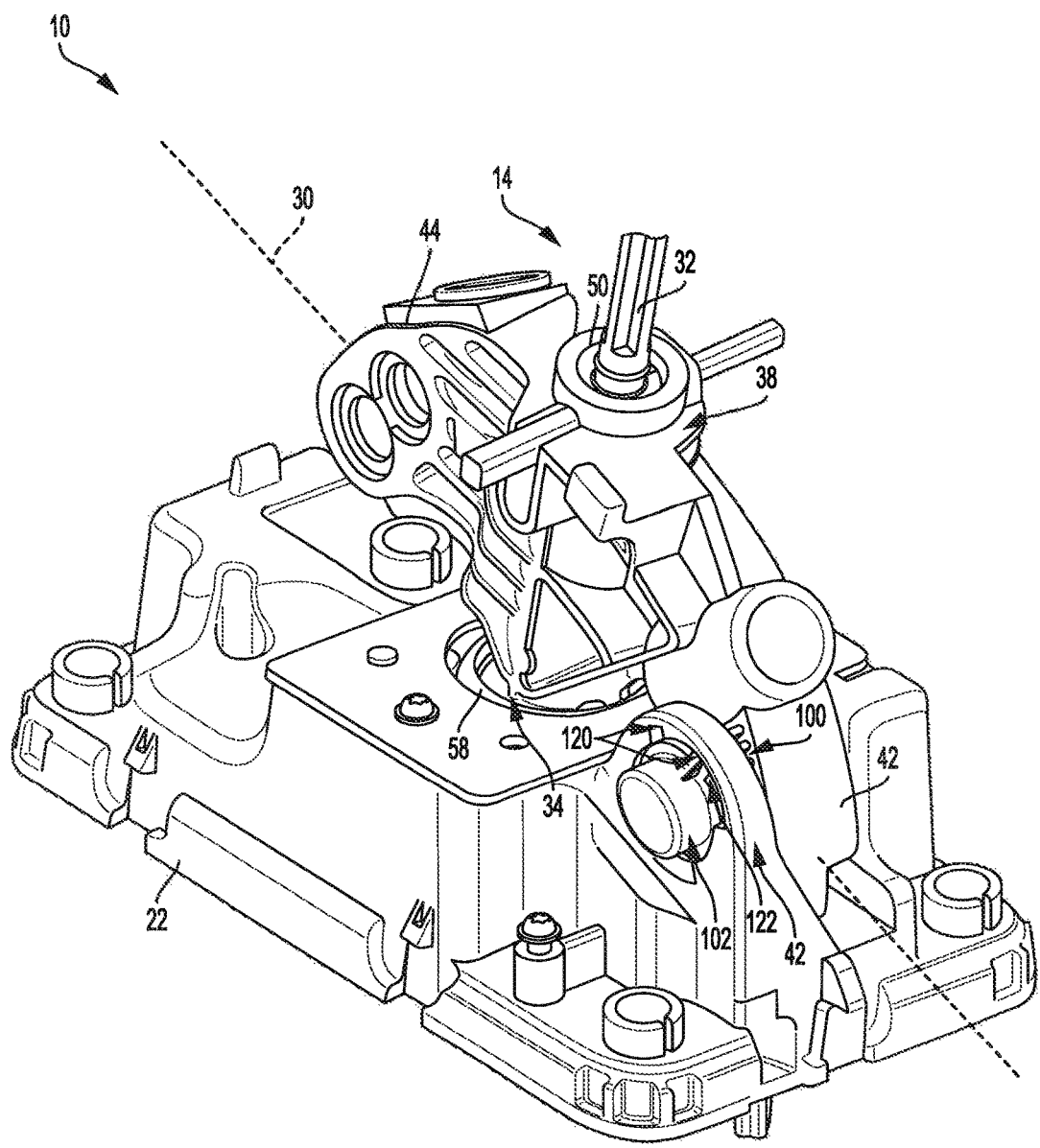
FIG. 2 is a rear perspective view of a portion of the shifter assembly shown in FIG. 1 in accordance with the principles of the present disclosure.

With initial reference to FIGS. 1 and 2, an exemplary poly-stable electronic shifter assembly is shown and generally identified at reference numeral 10. As discussed above, one of the benefits of a poly-stable electronic shifter includes an ability for a shift lever to remain in a position it is placed by a driver for selecting a transmission gear. Typical transmission gears to be selected are park (P), reverse (R), neutral (N), and drive (D).

As also discussed above, electronic shifters associated with shift-by-wire transmissions do not include a mechanical cable or link to the transmission, as would be the case for a mechanical shifter associated with a mechanically shifted transmission. The cable and shift systems of the mechanically shifted transmissions typically include a detent system incorporated into the transmission, which provides damping to the system. These conventional cable and shift systems can also have the cable moving through grease within a cable housing or sleeve, which also provides damping to movement of the shift lever.

Accordingly, an electronic shifter assembly 10 having a speed sensitive damping arrangement for use with a shift-by-wire automatic transmission is provided in accordance with various aspects of the present application. In one exemplary implementation, the speed sensitive damping arrangement provides increased damping or resistance to movement of the shift lever proportional to a speed of movement of the shift lever. In one implementation, the speed sensitive damping arrangement includes a gear driven device that can rotate at multiples of the shifter's velocity. Since damping is proportional to the square of the velocity, and the damping arrangement rotates at multiples of the shifter velocity, the damping arrangement can thus provide improved damping in a smaller, more simplified package.

In one exemplary implementation, the speed sensitive damping arrangement includes a speed sensitive damping assembly having a plurality of stacked plates packed with a viscous material or damping substance/material, such as damping grease, where movement of the shift lever causes relative movement of the stacked plates and the damping grease provides resistance to such relative movement. In one exemplary implementation, the damping grease is a high shear grease. In other configurations, the speed sensitive damping arrangement only includes a single plate due to the improved damping provided by the gear driven device.

In one exemplary implementation, the speed sensitive damping arrangement cooperates with an internal mechanical detent system of the electronic shifter assembly 10. As will be discussed in greater detail below, the speed sensitive damping arrangement cooperates with the mechanical detent system so as to provide internal damping with a smooth, controlled shifter feel while also working to aid in preventing overshoot of a desired gear. In this exemplary implementation, the speed sensitive damping arrangement provides a shifter feel comparable to the shifter feel of a mechanical shift system associated with a mechanically shifted transmission, with the speed sensitive damping making it easier for a driver to select a desired transmission gear while minimizing potential overshoot.

With reference to FIGS. 1-2, the electronic shifter assembly 10 generally includes, in one exemplary implementation, a base 12, a shift lever assembly 14 pivotably coupled to the base 12, a dual mechanical detent system 16 housed within base 12, and a speed sensitive damping arrangement or system 18 (e.g., FIG. 2) also housed within base 12. The base 12 is configured to be fixedly attached to a vehicle, such as in association with a center console of the vehicle. It should be appreciated, however, that the base 12 along with the components of electronic shifter assembly 10 can be attached or positioned in various interior locations of the vehicle. The base 12 is formed from any suitable materials, such as plastic, and can be provided in a one-piece construction or constructed of multiple components secured together.

In the exemplary implementation illustrated, the base 12 is provided in a two-piece construction having an upper base member 20 (FIG. 1) and a lower base member 22. The upper and lower base members 20, 22, when assembled together, form an outer base housing 24 (FIG. 1). It should be appreciated, however, that base 12 could also be provided with a separate outer housing formed from one or more pieces or members.

Figure 3:
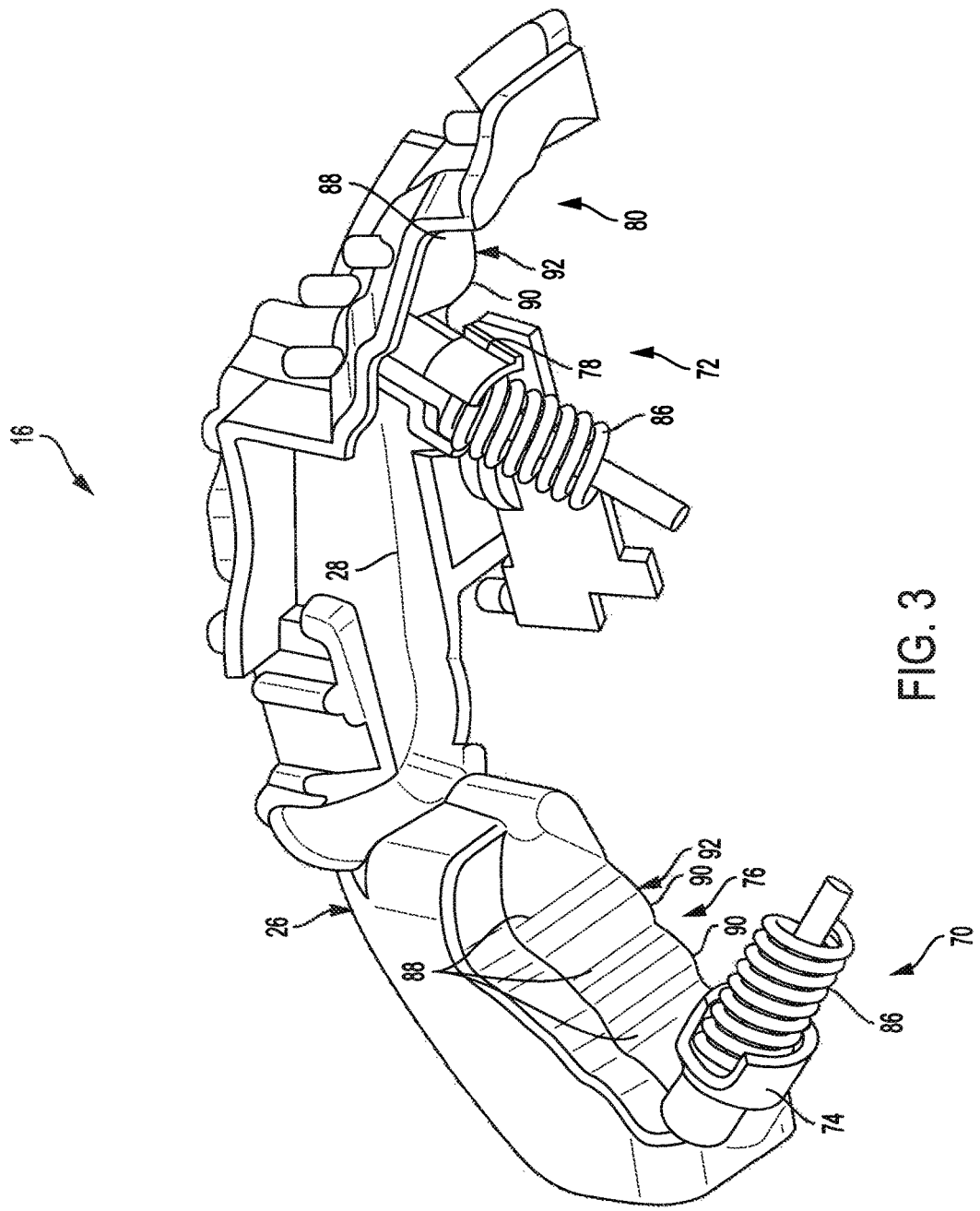
FIG. 3 is a bottom perspective view of an exemplary detent system plate shown in FIG. 1 in accordance with the principles of the present disclosure.

With additional reference to FIG. 3, the upper base member 20 includes an upper end 26 having or defining a gate guide 28 configured to aid in guiding the shift lever assembly 14 along a travel path or axis 30 (FIG. 1) between and among park (P), reverse (R), neutral (N) and drive (D) gear selection locations.

The shift lever assembly 14 includes a shift lever 32, a shift knob (not specifically shown) and a shift lever pivot base 34. The shift lever 32 includes a first or upper end 35 configured to be coupled to the shift knob and a second or lower end 36 fixed to the shift lever pivot base 34. With additional reference to FIG. 4, the shift lever pivot base 34 includes a body 38 defining a central bore 40 and first and second body members 42, 44 extending in opposite directions from central bore 40. In the exemplary implementation illustrated, the first and second body members 42, 44 extend in directions substantially in-line or substantially parallel to the travel axis 30 of the shift lever assembly 14, which will be discussed in greater detail below.

Figure 4:
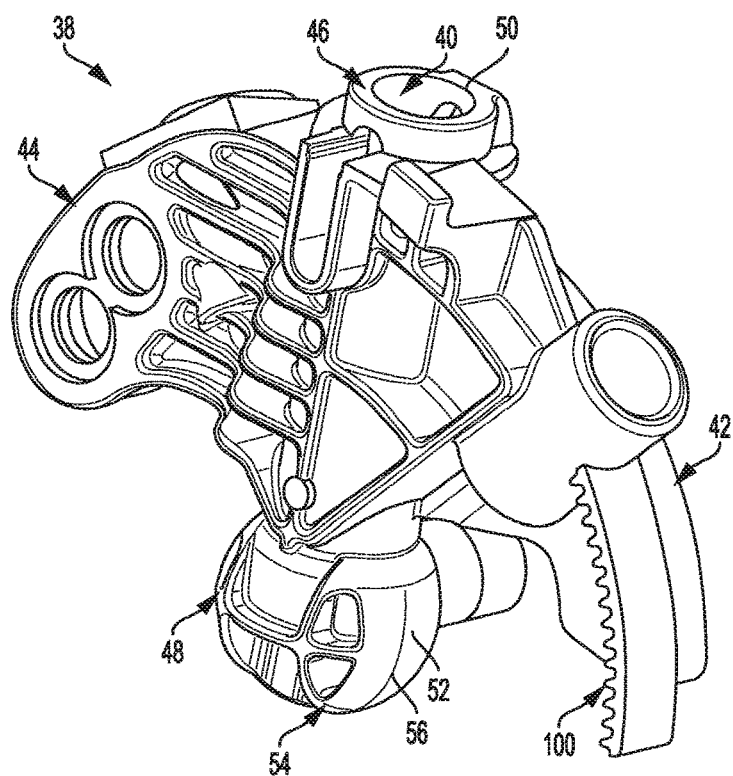
FIG. 4 is a perspective view of an exemplary shift lever pivot base shown in FIGS. 1 and 2 in accordance with the principles of the present disclosure.
Figure 5:
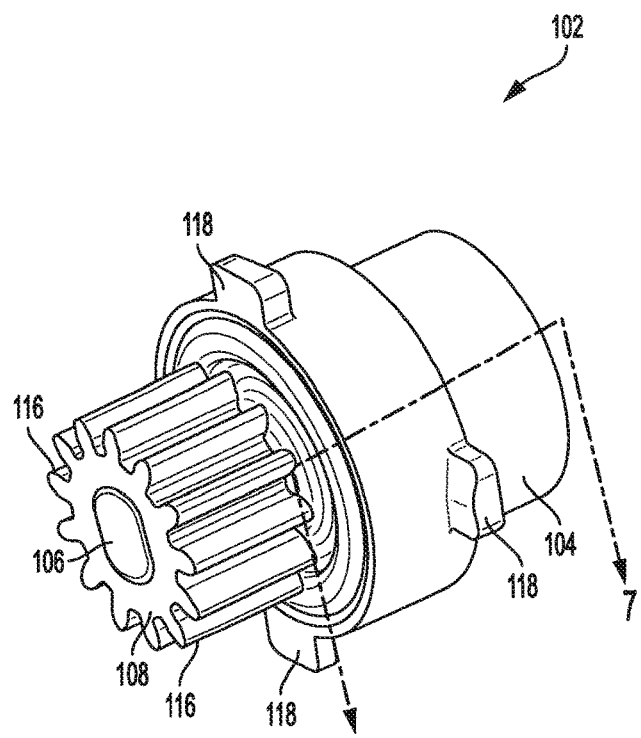
FIG. 5 is a perspective view of an exemplary speed sensitive damping assembly shown in FIG. 2 in accordance with the principles of the present disclosure.

The body 38 includes an upper end or surface 46 and a lower end or surface 48, as shown for example in FIG. 4. The upper surface 46 defines an opening 50 of central bore 40 and the lower surface 48 defines a coupling member 52. The lower end 36 of shift lever 32 is received in opening 50 and fixed to central bore 40. In one exemplary aspect, the coupling member 52 includes a male coupling member, such as a ball pivot member 54, with at least a portion of its outer surface 56 (FIG. 4) being spherical or substantially spherical. The coupling member 52 cooperates with a receptacle 58 (FIGS. 1 and 2) in lower base member 22 to pivotably couple the shift lever assembly 14 to base 12, as will be discussed in greater detail below.

The shift lever assembly 14 is pivotable as a unit relative to base 12 and gate guide 28 along travel axis 30. In other words, pivotal movement of the shift lever 32 correspondingly moves the shift lever pivot base 34 therewith. The shift lever assembly 14 is also pivotable along a lateral or cross-car axis 60 (FIG. 1) perpendicular to or substantially perpendicular to travel axis 30 to place the shift lever assembly 14 in, for example, a manual-automatic gear selection mode. For purposes of this discussion, however, the manual-automatic positions will not be described in greater detail herein.

With continuing reference to FIGS. 1-3, the dual mechanical detent system 16 of the electronic shifter assembly 10 will now be discussed in greater detail. The dual mechanical detent system 16 includes, in one exemplary implementation, first and second mechanical detent systems 70, 72. As shown in FIG. 3, the first mechanical detent system 70 includes a first detent plunger 74 and a first cam member 76. Similarly, the second mechanical detent system 72 includes a second detent plunger 78 and a second cam member 80. The first and second detent plungers 74, 78 are configured to engage and cooperate with the respective first and second cam members 76, 80, as will be discussed in greater detail below. In the exemplary implementation illustrated in the various figures, the first and second detent plungers 74, 78 are positioned in first and second bores 82, 84 defined by the respective first and second body members 42, 44 of shift lever pivot base 34, as shown for example in FIGS. 1 and 2.

The first and second detent plungers 74, 78 are biased into engagement with the respective cam members 76, 80, such as with a biasing mechanism 86 (FIG. 3). In the exemplary implementation illustrated, the first and second cam members 76, 80 are each attached to the base 12 such that the shift lever assembly 14 and first and second detent plungers 74, 78 associated therewith move relative to the cam members 76, 80 with the detent plungers 74, 78 in moving engagement therewith, as discussed below in greater detail.

The first and second cam members 76, 80 each define a cam profile or surface 92 formed by a plurality of grooves/valleys or detent positions 88 corresponding to various PRND gear selection locations in which the shift lever assembly 14 can be shifted to place the transmission in a desired gear. Each detent groove or position 88 is separated by a ridge/peak or protrusion 90 positioned therebetween, as shown for example in FIG. 3. As the shift lever assembly 14 is pivoted from the park gear selection location along travel axis 30 to the drive gear selection location, the first detent plunger 74 engagingly follows the cam member profile 92 of first cam member 76, and the second detent plunger 78 simultaneously engagingly follows the cam member profile 92 of the second cam member 80.

It should be appreciated that while the dual mechanical detent system 16 is illustrated, the electronic shift lever assembly 10 could also utilize only one detent plunger and corresponding cam member (e.g., a single mechanical detent system). A further discussion of the exemplary dual mechanical detent system 16 and its operation can be found in commonly owned, co-pending U.S. patent application Ser. No. 14/511,477 filed Oct. 10, 2014, and published as U.S. Pub. No. 2015/0114158, the entirety of which is incorporated by reference herein.

Figure 6:
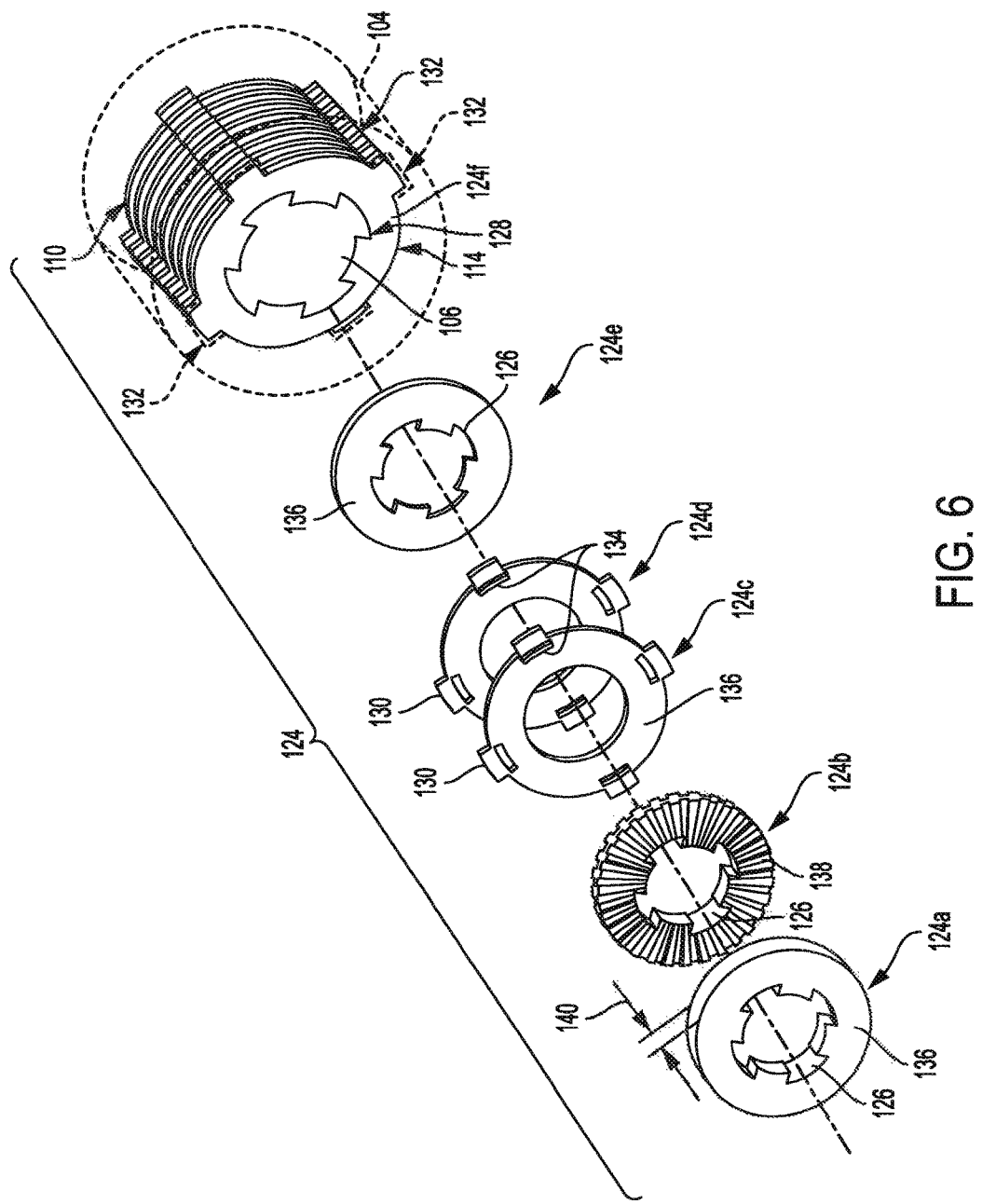
FIG. 6 is an exploded view of the speed sensitive damping assembly shown in FIG. 5 in accordance with the principles of the present disclosure.

With reference to FIGS. 2 and 4-7, the structure and operation of the speed sensitive damping arrangement 18 will now be discussed. In one implementation, the speed sensitive damping arrangement 18 is utilized with a shifter having a rack and pinion interface. In the exemplary implementation illustrated, the speed sensitive damping arrangement 18 includes a toothed profile 100 formed on first body member 42 (see FIG. 4), and a damping assembly 102 (FIGS. 5-7) having a housing 104, a shaft 106, a gear member 108, and a speed damping member 110 coupled to the shaft 106 and configured to interact with a viscous damping substance 112 (FIG. 7) to provide speed sensitive damping to movement of the shift lever assembly 14. In the illustrated implementation the speed damping member 110 is stacked plate arrangement 110 (FIG. 6). However, stacked plate arrangement 110 is merely exemplary and it should be understood that damping assembly 102 may include any suitable number of plates, including only a single plate. Alternatively, damping assembly 102 may include various other speed damping members such as, for example, an oil filled cylindrical damper.

As will be discussed in greater detail below, the speed sensitive damping arrangement 18 is configured to provide speed sensitive damping to movement of the shift lever assembly 14 as the one or more detent plungers 74 and/or 78 travel over the cam profiles 92. For example, as shown in FIG. 6, the shaft 106 with the stacked plate arrangement 110 positioned thereon are received in a cavity 114 of the housing 104, which is fixed from rotation in the base 12. Rotation or pivotal movement of the shift lever 32 along axis 30 rotates certain of the plates that are keyed to the shaft 106 relative to other of the plates that are keyed to the housing 104 and against the damping substance 112 that is packed into the housing 104 and about the stacked plate arrangement 110. The viscosity of the damping substance 112 and the number and surface characteristics of the plates can be varied, as well as a size of one gear member 108, to achieve the desired speed sensitive damping, as will also be discussed below.

In one exemplary implementation, the gear member 108 is coupled to one end of the shaft 106 and includes a plurality of teeth 116 (FIG. 5) about its circumference. The teeth 116 are meshingly engaged with the teeth 100 of the first body member 42, as shown in FIG. 2. In the illustrated implementation, toothed member 100 is curved. However, toothed member 100 may have any suitable shape. For example, toothed member 100 may be straight.

The housing 104, in one exemplary implementation, is generally cylindrical and includes one or more features or keys 118 (FIG. 5) configured to be received within corresponding recesses 120 formed in lower base 22 (see FIG. 2). For example, as shown in FIG. 2, the housing 104 is received within an aperture 122 formed in base 12, and keys 118 are received within recesses 120 to prevent rotation of the housing 104 within the aperture 122.

With reference to FIG. 6, the stacked plate arrangement 110 is disposed within housing 104 and includes a plurality of annular discs or plates 124a, 124b . . . 124n (collectively, plates 124) assembled in a stacked configuration on shaft 106, for example, as partially shown in FIG. 6. As will be discussed in greater detail below, at least one of the annular plates 124, e.g., plate 124b, has an interior key 126 complimentary to the keyed exterior 128 of shaft 106 such that plate 124b slides axially on the shaft 106 but is fixed for rotation therewith; and at least another one of the annular plates 124, e.g., plate 124c, has an exterior key 130 complimentary to an internal key 132 of the housing 104 such that plate 124c slides axially in cavity 114 but is rotationally fixed thereto.

For example, and with particular reference to FIG. 6, various different configurations of the plates 124 can be utilized to obtain different damping amounts and/or configurations. The illustrated example implementation includes an arrangement where multiple adjacent plates 124 of the stacked plate configuration can include the same external key 130 and/or internal key 126. In other implementations, the plates 124 have an alternating key configuration between the exterior key 130 and the interior key 126.

In addition to the key arrangements 126, 130, the plates 124 include various different configurations of spacers 134, including an absence of any spacer 134. The plates 124 can also include various different surface configurations, such as a smooth or substantially smooth exterior surface 136 (e.g., plate 124e), and a non-smooth exterior surface such as a ribbed or splined surface 138 (e.g., plate 124b). The plates can further include different thickness 140 as measured in the longitudinal or axial direction of shaft 106 and shown in FIG. 6.

Varying the exterior surface 136, 138 thickness 140, and space between the plates 124 via spacers 134 changes the interaction with and/or amount of damping substance 112 between and associated with the plates 124. Similarly, increasing the number of plates 124 increases the friction, and thus damping, associated with moving the plates 124 relative to each other and the damping substance 112 based on movement of the shift lever 32. Increasing or decreasing the shear resistance of the damping substance also increases or decreases, respectively, the damping ability of the damping substance, as discussed below.

The viscous damping substance 112 (FIG. 7) is, in an exemplary implementation, high shear damping grease. As will be appreciated by those skilled in the art, a distinguishing difference between standard greases and damping greases is shear resistance. High shear damping greases are generally formulated with viscous, i.e., high molecular weight synthetic oils, which give them a much higher internal shear resistance than standard greases. Unlike standard greases, it takes a degree of force to move an object through a damping grease. This internal shear resistance enables damping grease to damp or control motion, noting that the higher the shear resistance the greater the degree of damping. When the damping grease is applied to mating surfaces, such as for example adjacent exterior surfaces 136 of the plates 124, it will require a greater degree of force to move those surfaces relative to or in opposition to one another.

The stacked plate arrangement 110, as depicted in FIG. 6, is shown in a partially assembled condition on shaft 106. As discussed above, each plate 124 with the internal key 126 is fixed for rotation with the shaft 106 via keyed exterior 128. As shaft 106 is fixed to the toothed profile 100 (FIG. 4) through gear member 108 (FIG. 2), pivoting the shift lever 32 rotates shaft 106 and thus the plates 124 keyed thereto. Each of the plates 124 with the external key 130, which are interposed between plates 124 with the internal key 126 in one illustrated example, are keyed to the internal key 132 of housing 104 when housing 104 is assembled onto shaft 106 and over and about the stacked plate arrangement 110. As will be discussed in greater detail below, when shift lever 32 is pivoted as discussed immediately above, the internally keyed plates 124 rotate with the shaft 106 and relative to the externally keyed plates 124, which are rotationally fixed to the housing 104, which is rotationally fixed to the shifter assembly base 12 in the receptacle 58 thereof.

Figure 7:
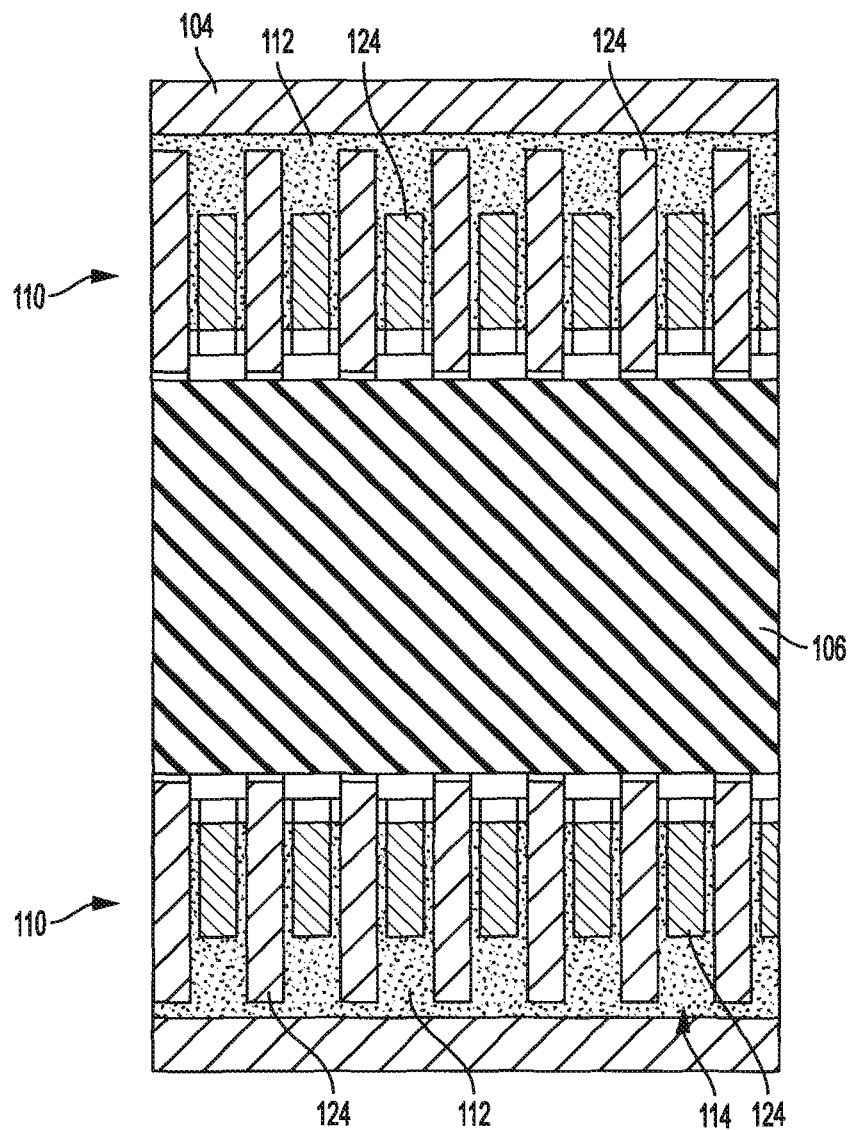
FIG. 7 is a cross-sectional view of the speed sensitive damping assembly shown in FIG. 5 taken along line 7-7 in accordance with the principles of the present disclosure.

In operation, the damping grease 112 is applied to the stacked plate arrangement 110 and inside the cavity 114 of housing 104 when the stacked plate arrangement is positioned therein along with shaft 106 (see FIG. 7). In one exemplary implementation, the damping grease 112 is applied to the exterior side surfaces 136, 138 of each plate 124 such that there is damping grease 112 interposed between each adjacent plate 124 of the stacked plate arrangement 110 on shaft 106. Once shaft 106 with the stacked plate arrangement 110 positioned thereon is assembled into cavity 114 of housing 104, the damping grease 112 is optionally also packed into cavity 114 filling or substantially filling any remaining void space therein.

Shift lever assembly 14 with the speed sensitive damping arrangement 18 is associated/coupled with base 12 such that the pivot ball member 54 is pivotably positioned in or coupled to base 12, and the housing 104 is slidably received within lower base aperture 122, as shown in FIG. 2. With this shifter assembly 10, the speed sensitive damping arrangement 18 provides tunable speed sensitive damping to pivotal movement of the shift lever 32 along travel axis 30. In addition, the aperture 122 provides for fixing housing 104 from rotating while allowing slidable movement of toothed profile 100 in a direction parallel to axis 60. Such movement is required, for example, when shift lever 32 is pivoted laterally or cross-car along lateral axis 60 to enable a sport mode and/or manual-automatic shift mode.

As discussed above, such speed sensitive damping is provided by the combination of the stacked plate arrangement 110 and the relative movement of the plates 124 associated therewith combined with the damping grease 112 interposed between the plates 124 and packed into cavity 114 of housing 104. The number of plates 124 can be increased or decreased to increase or decrease the amount of damping, respectively, thereby providing an easily tunable speed sensitive damping arrangement that is proportional to the speed of movement of the shift lever 32. The speed sensitive damping arrangement 18 provides very low resistance at low or zero speed (e.g., positions between gears) making it easy for the operator to initiate a gear change while also providing high resistance at higher speeds thereby providing a quality feel to the operator with detent energy being dissipated in the damping arrangement and not the operator's hand. For example, the shift lever 32 and thus the damping arrangement 18 accelerate when detent system plungers 74, 78 move from a detent profile peak 90 to a detent profile valley 88. The increase in acceleration of damping arrangement causes a higher resistance, thereby dissipating the detent energy to prevent over-shooting of the desired gear position. Moreover, the driven gear member 108 of the damping arrangement 18 rotates at multiples (e.g., 3:1) of the velocity of the shift lever body 38 and toothed profile 100. This results in increased damping since damping is proportional to the square of the shift lever velocity. Thus, damping arrangement 18 provides greater damping and damping tunability within a smaller package.

In one exemplary aspect, the speed sensitive damping arrangement 18 in combination with the detent system dampens movement of the shift lever making it easier for the operator to find the desired detent position (i.e., gear position) by eliminating or substantially eliminating the coasting of the lever 32 past the next detent position after the desired gear. Such speed sensitive damping provides for a smoother and more controlled shift lever movement experience, as well as make it easier for a user to select a desired gear selection location while minimizing overshoot.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electronic shifter assembly, the shifter assembly comprising:
   a shift lever;
   a coupling member pivotably coupling the shift lever to a base of the shifter assembly, the coupling member having a toothed member;
   a speed sensitive damping arrangement housed in the base, the damping arrangement including:
      a housing associated with the base and defining an internal cavity;
      a shaft disposed in the internal cavity and having an end extending from the housing;
      a gear member coupled to the end of the shaft and configured for rotation therewith, the gear member meshingly engaged with the toothed member such that pivotable movement of the coupling member via the shift lever rotates the gear member and the shaft;
      a damping member coupled to the shaft and positioned in the internal cavity such that rotation of the shaft via movement of the shift lever causes relative rotation of the damping member; and
      a damping substance packed into the internal cavity and about the damping member such that the damping substance provides resistance to movement of the damping member;
   wherein pivotal movement of the shift lever causes the gear member and the damping member to rotate faster than the shift lever such that damping the movement of the shift lever provided by the speed sensitive damping arrangement is proportional to a square of a speed of movement of the shift lever.

2. The shifter assembly of claim 1, wherein the damping member comprises a plurality of stacked plates associated with the shaft and the internal cavity, at least one of the stacked plates keyed to the shaft and at least another one of the stacked plates keyed to the housing such that rotation of the shaft via movement of the shift lever causes relative movement of the at least one and the at least another one of the stacked plates, and wherein the damping substance is packed in the internal cavity about the plurality of stacked plates.

3. The shifter assembly of claim 1, wherein the damping substance comprises high shear damping grease.

4. The shifter assembly of claim 1, wherein the housing is positioned in an aperture formed in the base, the housing being rotationally fixed within the aperture.

5. The shifter assembly of claim 4, wherein movement of the shift lever along a first axis associated with selecting drive and reverse gears rotates the shaft relative to the housing.

6. The shifter assembly of claim 2, wherein each plate of the plurality of stacked plates comprises an annular plate having a central aperture, each annular plate positioned on the shaft via the respective apertures such that the plurality of stacked plates are positioned adjacent to each other in an axially stacked arrangement on the shaft.

7. The shifter assembly of claim 6, wherein each stacked plate of the plurality of stacked plates includes a spacer configured to engage an adjacent stacked plate of the plurality of stacked plates when positioned on the shaft thereby providing a gap between the plurality of stacked plates in the axially stacked arrangement for receiving the damping substance.

8. The shifter assembly of claim 6, wherein each of the at least one of the stacked plates keyed to the shaft includes an internal key associated with the central aperture and a channel defined by the shaft; and
wherein each of the at least one of the another stacked plates keyed to the housing includes an external key associated with an outer perimeter of the at least another one of the stacked plates and a channel defined by the internal cavity.

9. The shifter assembly of claim 6, wherein the plurality of stacked plates in the axially stacked arrangement along with at least a portion of the shaft are received in the internal cavity of the housing.

10. The shifter assembly of claim 6, wherein each plate of the plurality of stacked plates in the axially stacked arrangement is axially slidable on the shaft, and wherein the at least one of the stacked plates keyed to the shaft is rotationally fixed to the shaft and the at least another one of the stacked plates keyed to the housing is rotatable relative to the shaft.

11. The shifter assembly of claim 2, wherein the damping substance comprises high shear damping grease, and wherein the damping grease is packed into the cavity about and between each of the stacked plates of the plurality of stacked plates.

12. The shifter assembly of claim 1, wherein the housing includes at least one projection extending therefrom, and the base includes at least one recess, wherein when the housing is inserted into an aperture in the base, the at least one projection is received within the at least one recess to facilitate preventing rotation of the housing within the aperture.

* * * * *